United States Patent [19]

Odagiri et al.

[11] 4,190,877

[45] Feb. 26, 1980

[54] MINIATURE VARIABLE CAPACITOR

[75] Inventors: Shigeyoshi Odagiri, Machida; Yoshikatsu Iizuka, Tama; Tugiaki Danmura, Zama, all of Japan

[73] Assignee: Mitsumi Electric Co., Ltd., Chofu, Japan

[21] Appl. No.: 951,295

[22] Filed: Oct. 13, 1978

[30] Foreign Application Priority Data

| Oct. 15, 1977 | [JP] | Japan | 52-138518 |
|---|---|---|---|
| Oct. 15, 1977 | [JP] | Japan | 52-138519 |
| Mar. 27, 1978 | [JP] | Japan | 53-34090 |
| Jul. 7, 1978 | [JP] | Japan | 53-93722 |
| Jul. 11, 1978 | [JP] | Japan | 53-95438 |

[51] Int. Cl.² ........................................ H01G 5/06
[52] U.S. Cl. ................................... 361/298; 361/300
[58] Field of Search ........................ 361/298, 299, 300

[56] References Cited

U.S. PATENT DOCUMENTS

| 3,701,932 | 10/1972 | Johanson | 361/299 |
| 3,949,280 | 4/1976 | Odagiri | 361/298 |

Primary Examiner—E. A. Goldberg
Attorney, Agent, or Firm—Haseltine, Lake & Waters

[57] ABSTRACT

A miniature variable capacitor comprises a base plate having a base plate main part having stator support poles embedded in one surface of said base plate main part and mounting plate parts extending from said base plate main part in lateral directions and adapted to be fitted to a mount member different from said miniature variable capacitor, and a miniature variable capacitor main body comprising a rotor shaft rotatably supported at the center of said base plate main part, stator plate groups fixedly supported on said stator shafts, and rotor plate groups fixedly supported on said rotor shaft. The base plate further has bent parts bent in the direction in which said stator poles project and formed between said base plate main part and said mounting plate parts and integral therewith, whereby said mounting plate parts is not on the same level as said base plate main part but stepped in the stator support poles projecting direction from said base plate main part.

9 Claims, 22 Drawing Figures

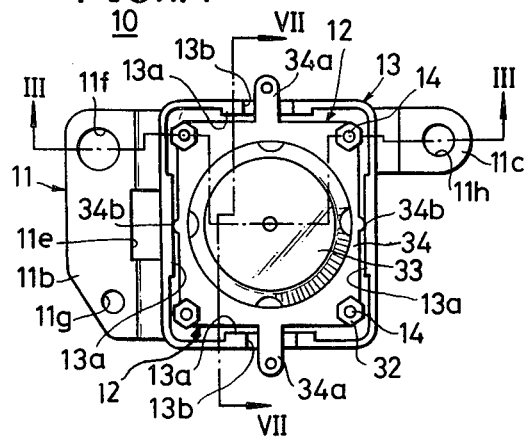
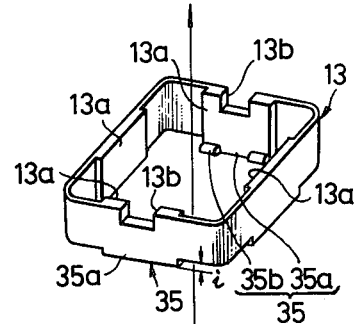
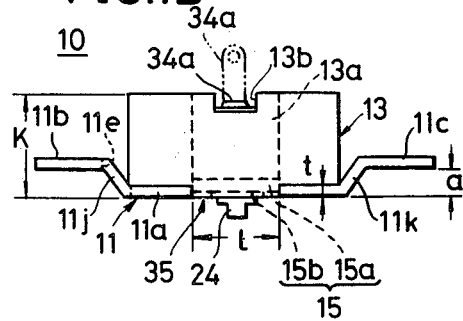
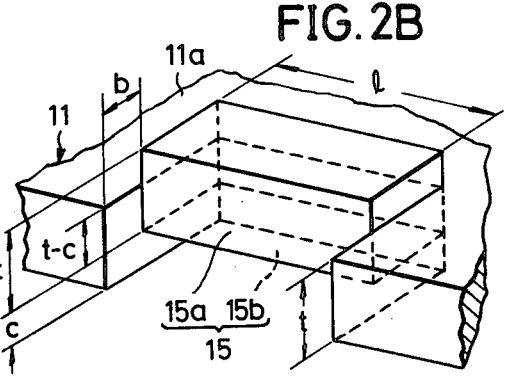
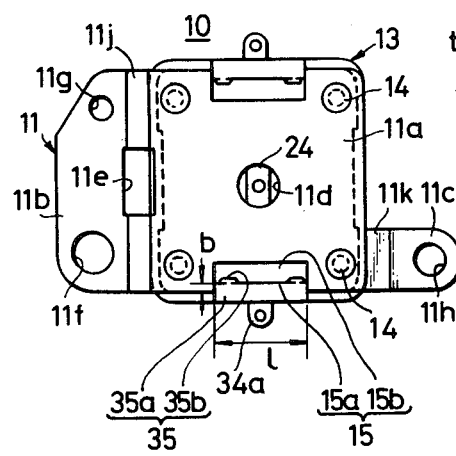

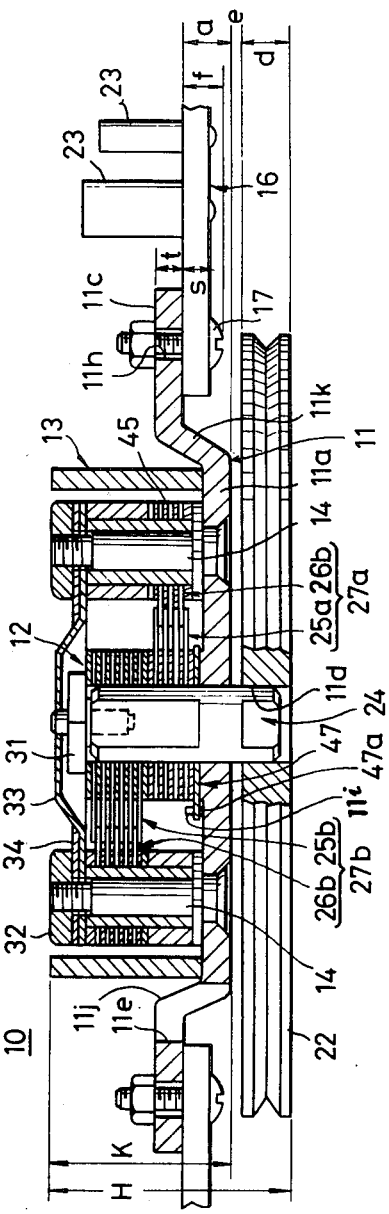
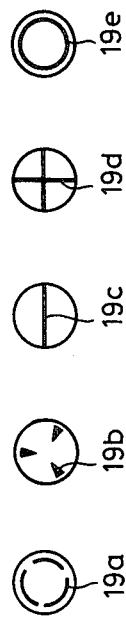
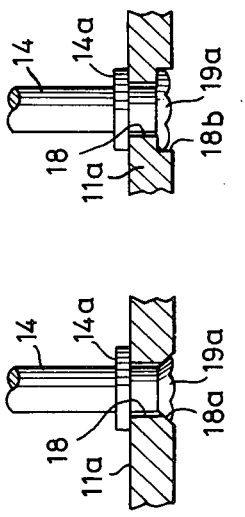

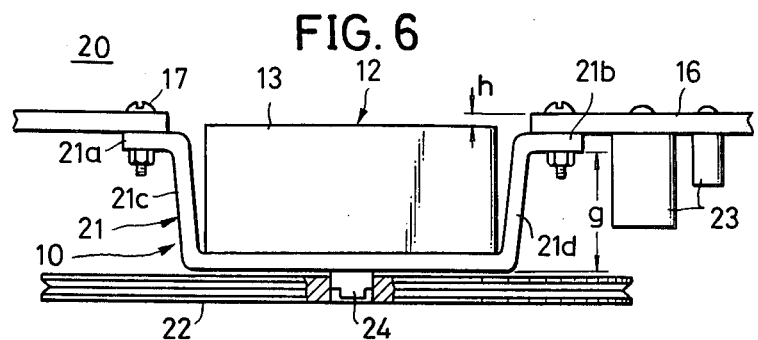
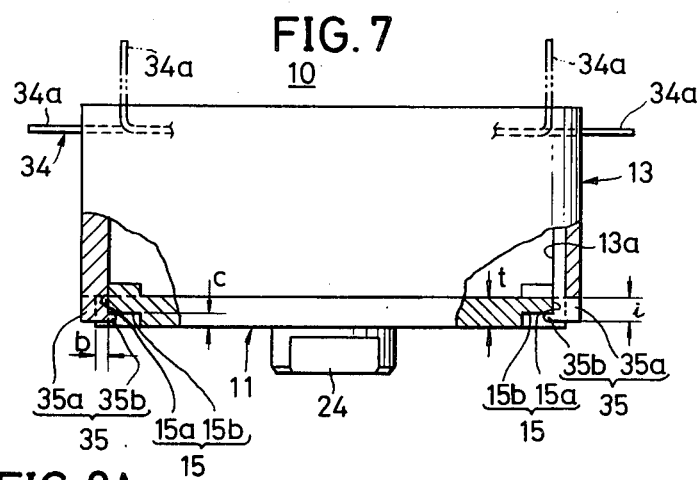
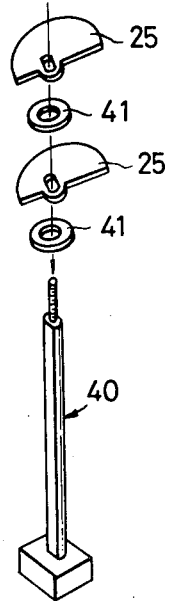
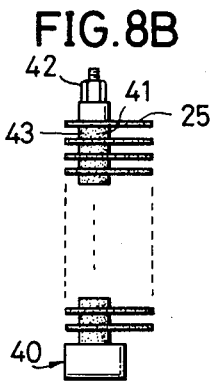
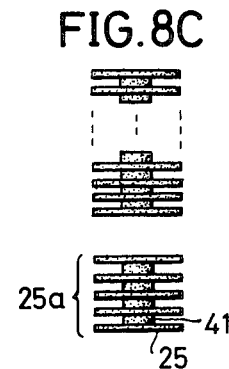

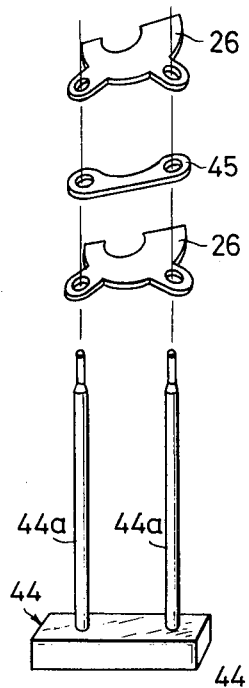
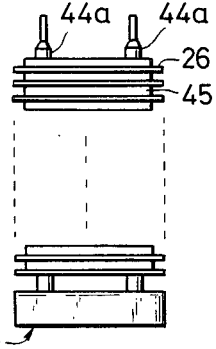
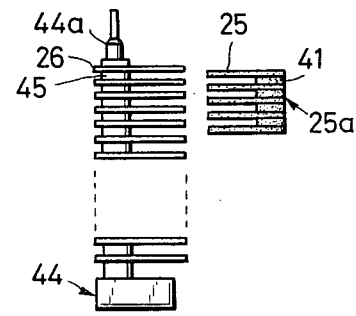
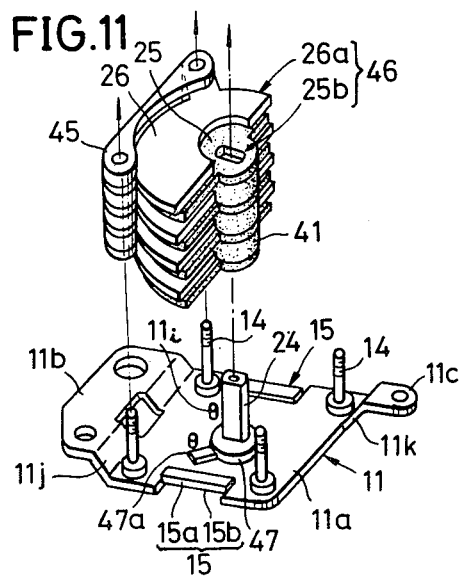

# MINIATURE VARIABLE CAPACITOR

BACKGROUND OF THE INVENTION

This invention relates generally to miniature variable capacitors and more particularly to a miniature variable capacitor wherein mounting lugs are bent and formed in a base plate for supporting a variable capacitor main body, whereby the thickness of the mounting construction is reduced.

There is a trend toward thinness in miniature portable radio receivers incorporating miniature variable capacitors. Recently, there has been a demand for miniature portable radio receivers reduced to the dimensions comparable to those of very thin memorandum notebooks. In meeting this demand, there arises a critical problem how is the thickness of the miniature variable capacitor, which is a relatively bulky part, to be reduced to fit inside the radio receiver case.

The miniature variable capacitors known heretofore have a general construction wherein projections on opposite sides of a plane base plate having a variable capacitor mounted thereon are used, as they are, as mounting lugs. The mounting lugs are respectively fastened by screws to a chassis. Accordingly, when the mounting lugs are fixed on the chassis, the overall thickness of the variable capacitor mounting construction becomes larger than that of the variable capacitor by at least the thickness of the chassis. Alternatively, if the mounting lugs are positioned just below the chassis, the thickness of the variable capacitor mounting construction becomes greater than that of the variable capacitor by the amount that the head of the mounting screw or nut projects. For these reasons, it is difficult, with the above described type of construction to satisfactorily meet the demand for ultra thin products.

SUMMARY OF THE INVENTION

Accordingly, it is a general object of the present invention to provide a novel and useful miniature variable capacitor, in which the above described difficulties have been overcome.

A specific object of the present invention is to provide a miniature variable capacitor in which a variable capacitor base plate is bent to form a concavity, and a variable capacitor main body is accommodated in the concavity thus formed. This concaved base plate additionally has the function of shielding the variable capacitor main body, thereby improving performance of the variable capacitor.

Another object of the present invention is to provide a miniature variable capacitor in which the bottom ends of the stator support poles are fixed to the variable capacitor base plate through caulking so as not to project from the bottom surface of the base plate. This construction makes it possible to reduce the overall thickness of the variable capacitor.

A further object of the present invention is to provide a miniature variable capacitor in which a base plate and a casing for encircling a variable capacitor main body are engaged by their respective engagement parts and are interconnected with each other. According to this construction, the casing is securely fixed to the base plate through a simple operation.

Other objects and features of the invention will be apparent from the following detailed description with respect to preferred embodiments of the invention when read in conjunction with the accompanying drawings.

BRIEF DESCRIPTION OF THE DRAWINGS

In the drawings:

FIG. 1A, FIG. 1B, and FIG. 1C are respectively a plan view, an elevational view, and a bottom view, showing one embodiment of a miniature variable capacitor according to the present invention;

FIG. 2A is an exploded perspective view of a variable capacitor base plate and a casing shown in FIGS. 1A through 1C;

FIG. 2B is a fragmentary enlarged perspective view, showing an essential part of the base plate;

FIG. 3 is a sectional view taken along the line III—III in FIG. 1A;

FIGS. 4A and 4B are fragmentary vertical sections, showing embodiments of a structure for securing a stator pole to a variable capacitor base plate;

FIGS. 5A through 5E are bottom views respectively showing modifications of stator poles to which various caulkings have been applied;

FIG. 6 is an elevational view of another embodiment of a miniature variable capacitor of the present invention;

FIG. 7 is a partially sectional view taken along the line VII—VII in FIG. 1;

FIGS. 8A through 8C are illustrations, respectively showing processes for assembling a rotor plate group;

FIGS. 9A and 9B are illustrations respectively showing processes for assembling a stator plate group;

FIG. 10 is a diagramatic view showing the process of assembling the rotor plate group and stator plate group; and FIG. 11 is a diagramatic perspective view, showing the process of assembling a sub-assembly of the rotor plate group and stator plate group on a variable capacitor base plate.

DETAILED DESCRIPTION

Referring first to FIG. 1 through FIG. 3, the general construction of one embodiment of a miniature variable capacitor according to the present invention will be described.

A miniature variable capacitor 10 substantially comprises a variable capacitor base plate 11, a variable capacitor main body 12 mounted on the base plate 11, and a square-frame-formed casing 13 adapted to encircle the main body 12.

The base plate 11 is formed by pressing a thin metal plate having a thickness of t into a predetermined shape. This press-formed base plate 11 integrally has a main part 11a of substantially square shape, a pair of stepped-bends 11j and 11k formed by bending opposite sides of the main part 11a substantially in the direction in which the stator support poles 14 described hereinafter project, and a pair of mounting lugs 11b and 11c formed by bending free ends of the stepped-bends 11j and 11k outward, in parallel to the main part 11a. The step dimension between the main part 11a and the mounting lugs 11b and 11c is a. The stepped bends 11j and 11k and the main part 11a form a concavity.

The main part 11a has an opening 11d formed for a rotor shaft, and a pair of pin-shaped projections 11i for restricting the rotational angular range of the rotor shaft. A stepped-part near the mounting lug 11b is formed with a square opening 11e for facilitating the above described bending working. Moreover, the mounting lugs 11b and 11c are formed with mounting holes 11f, 11g, and 11h.

Four stator support poles 14 are respectively embedded by caulking as described hereinafter, and project upward from the four corners of the base plate main part 11a.

A pair of first engagement parts 15 is formed in the base plate main part 11a, one on each side, as shown in FIG. 2A. The first engagements 15 are press-formed, as shown on a large scale in FIG. 2B, and respectively have a lateral stepped surface 15a which has a width of l and a thickness of t, which is equal to the thickness of the base plate 11, and is set back by a dimension b from the lateral edge surface of the base plate 11, and a bottom stepped surface 15b which is positioned a dimension c upward from the lower surface of the base plate 11.

The above described variable capacitor base plate 11 is easily formed by bending an appropriately shaped metal plate. On this base plate 11 are mounted successively a rotor shaft 24, the variable capacitor main body 12, and the casing 13, and this sub-assembly is then secured by screws 17 through the mounting holes 11f through 11h to a chassis 16 having circuit elements 23 mounted thereon. A driving pulley 22 is fitted to the lower end part of the rotor shaft 24 projecting from the bottom surface of the base plate 11. Accordingly, the mounting structure indicated in FIG. 3 has a total thickness dimension H, which is expressed as follows.

$$H = K + d + e$$

where

K is the thickness from the bottom surface of the base plate 11 to the top of the variable capacitor;

d is the thickness of the pulley 22; and e is the gap between the base plate 11 and the pulley 22.

Moreover, in the structure indicated in FIG. 3, the step dimension a of the variable capacitor base plate 11 is set to a value larger than the combined thickness f of a chassis 16 and the head of the screw 17, that is, $a > L$. Accordingly, the dimension f is accommodated within the step dimension a, and the total height H thereby being able to be reduced to minimum, being completely free from an adverse effect of the dimension f.

The step dimension a is not limited to the above, but may be less than the thickness s of the chassis 16. In this instance, the lower surface of the chassis 16 is positioned below the lower surface of the base plate 11. However, the height of step a is preferably more than half of the chassis thickness s, that is, $a \geq \frac{1}{2} s$.

Moreover, according to the above described construction, the miniature variable capacitor 10 is secured to the chassis 16 by the screws 17 at outside parts separated from the variable capacitor main body 12, that is, a pair of mounting lugs 11b and 11c. Therefore, the variable capacitor main body 12 is not adversely affected by mechanical distortion due to screw fastening, and is therefore capable of improved performance without accompanying difficulties such as capacitance fluctuation. In connection with this, the thickness t of the base plate 11 can be reduced greatly, and the overall thickness dimension H can be reduced by the amount of the thickness of the base plate 11.

Moreover, the variable capacitor main body 12 is accommodated, in part, in the concavity formed or defined on the variable capacitor base plate 11 by the pair of bends 11j and 11k, and the pair of mounting lugs 11b and 11c extending outward from the opposite sides of the concavity. Therefore, the base plate 11 has a shielding effect of an unrequired stray capacity from outside toward the main body 12.

FIG. 4A shows how the stator support pole 14 is fixed by embedding it in the variable capacitor base plate 11. A through-hole 18 having a flared bottom 18a is formed at a predetermined position in the base plate 11. The support pole 14 is inserted in the hole 18 and is caulked at its lower end. Accordingly, the support pole 14 is positioned and embeddedly fixed in the base plate 11, with a flange 14a in contact with the upper surface of the main part 11a and the lower end part is deformed to press against the flared opening 18a, as indicated in FIG. 4A. The lower end surface of the pole 14 thus caulked is, for example, a tooth shape caulking 19a as shown in FIG. 5A. The lower end of the pole 14 thus caulked is deformed and accommodated in the flared opening 18a, and does not project from the lower surface of the base plate 11. For this reason, the gap e in FIG. 3 is further reduced, and the total thickness dimension H is accordingly reduced.

FIG. 4B shows another structure of the stator support pole 14 fixed by caulking. The hole 18 is formed with an enlarged part 18b of a spot-facing shape. The lower end part of the support pole 27 is caulked to be deformed within the enlarged part 18b.

The caulked shape is not limited to the shape 19a, but other caulked shapes 19b through 19e indicated in FIG. 5B through FIG. 5E may be also adopted. From the point of view of perpendicularity (including anti-torsional resistance, and resistance to extraction), the above described caulked shape 19a is the most preferred.

Moreover, reduction of the gap e may lead to shortening of the length of the rotor shaft 24 projecting below the base plate 11, thus the cost of material for the shaft 24 can be reduced.

FIG. 6 shows a miniature variable capacitor 20 of an embodiment which is adapted so that the chassis 16 can be directly subjected to dip-soldering operation. A variable capacitor base plate 21 has a pair of deep bends 21c and 21d and a pair of mounting lugs 21a and 21b, all of which are formed integrally through bending operation. A step dimension g of the base plate 21 is set larger than the step dimension a of the above described base plate 11, that is, $g > a$. Furthermore, the base plate 21 is screwed to the chassis 16, in a state where the mounting lugs 21a and 21b are below the chassis 16. According to this structure, the variable capacitor mechanism 12 is positioned with respect to the chassis 16 in such a manner that the top surface of the main body 12 is below the upper surface of the chassis 16 by a distance h.

Accordingly, the dip-soldering operation is carried out while the chassis 16 faces downward, and the projected terminals of the circuit elements 23 are soldered and fixed, without any adhesion of solder to the main body 12.

Referring to FIG. 3, the rotor shaft 24 passes through an opening 11d of the variable capacitor base plate 11. A pair of rotor plate groups 25a and 25b (respectively comprising a plurality of rotor plates 25) fitted on the rotor shaft 24 constitutes, in cooperation with a pair of stator plate groups 26a and 26b (respectively comprising a plurality of stator plates 26) fitted on the stator support poles 14, a pair of variable capacitor parts 27a (25a and 26a) and 27b (25b and 26b), thus forming the variable capacitor main body 12. The rotor plate groups 25a and 25b are tightly secured around the rotor shaft 24 by a bolt 31 threaded to the rotor shaft 24. The stator plate groups 26a and 26b are also tightly secured by nuts 32. Furthermore, the rotor shaft 24 is urged to press against the base plate 11 by a rear plate 33 and a ring-shaped top plate 34 having a pair of lugs 34a and 34a.

The casing 13 is molded from a transparent resin to be, for example, a square frame shape. Inward projections 13a disposed on each inner side of the square frame at their center positions over a width l, and second engagements 35 disposed on a specific pair of inward projections, confronting each other, at their positions near the bottom edges are molded unitarily with the casing 13. The engagements 35 are formed by a downward projection 35a projecting downward by a dimension i which is slightly less than the thickness t of the variable capacitor base plate 11 and by engagement latches 35b projecting inwards at the lower edge of the downward projections 35a. The casing 13 is formed, at the upper parts of the pair of projections 13a, with U-shaped cuts 13b.

Accordingly, when this casing 13 is placed onto the variable capacitor base plate 11, encircling the variable capacitor main body 12 in which the pair of lugs 34a are still bent upward as indicated by two-dot chain line in FIG. 7, the engaging latches 35b pass over the lateral stepped surface 15b and are resiliently restored inwards. Accordingly, the casing 13 is fitted to the base plate 11 with the downward projections 35a engaging with the cuts and contacting the lateral stepped surface 15a and the engagement latches 35b engage with the bottom stepped surface 15b. Then, the pair of lugs 34a are bent to be horizontal thereby to engage each U-shaped cut 13b, thus positively holding the casing 13. Here, since the casing 13 is somewhat depressed downward by the lugs 34a, each engagement latch 35b is held securely.

Accordingly, the casing 13 is fitted to the base plate 11 in such a manner that there is no play in the direction of rotation or in the lateral directions by engagement of the downward projection 35a of the second engagement 35 with the lateral stepped surface 15a of the first engagement 15, and further there is no play in the thickness direction by the engagement of the engagement latches 35b with the bottom stepped surface 15b.

Furthermore, since the downward projection 35a and the lateral stepped surface 15a contact with each other over the sufficient thickness dimension t, which is equal to the thickness of the base plate 11, the maximum contacting area can be secured, which results in more stable engagement condition and prevention of deformation of the casing 13.

Still furthermore, the latches 35b of the casing 13, in their latched state, are accommodated within a bottom stepped part of the dimension c and do not project downward from the lower surface of the base plate 11. Therefore, the latches 35b are subjected to little or no unnecessary external force, which ensures a more stable fit of the casing 13.

Still furthermore, a pair of projections 34b at left and right sides of the top plate 34 respectively make contact with each of the other pair of projections 13a, as indicated in FIG. 1A. Accordingly, the casing 13 is held in its original shape and is prevented from deforemation due to flexion more positively.

For operating the miniature variable capacitor 10 of the above construction, a dial knob is turned, for example. As a result, the pulley 22 is rotated together with the rotor shaft 24.

As the rotor shaft 24 rotates, the rotor plates 25 rotate to change areas confronting the stator plates 26, thus adjusting capacitance variably. The capacitance thus adjusted variably is led out between the base plate 11 or the lug 34a respectively electrically conductive to the rotor shaft 24 and a stator terminal (not shown) electrically conductive to the stator plates 25. The angular range of rotation of the rotor shaft 24 is restricted between two positions where a stop member 47 fitted to the rotor shaft 24 comes to abut at its arm part 47a against any one of the pair of pins 11i as indicated in FIG. 3 and FIG. 11.

The construction of the first engagement 15 is not limited to the above embodiment in which it is press-formed unitarily with the base plate 11, but may be made in such a manner that a base plate equivalent member having the first engagement is manufactured independent of the base plate 11, and thereafter the member is fixed to the base plate 11.

Next, the assembling of the variable capacitor sections 27a and 27b is described.

Referring to FIGS. 8A and 8B, a plurality of rotor plates 25 and rotor washers 41 are alternately transfixed on a jig rod 40 which has an elliptical cross section similar to that of the rotor shaft 24 and is longer than the rotor shaft 24. Finally, a nut 42 is screwed onto a threaded part and tightened so that the rotor plates 25 are respectively positively positioned at a predetermined angular position and are stacked in the axial direction of the jig rod 40.

Then, the sub-assembly of the rotor plates 25 and the washers 41 is subjected to a dielectric material vaporisation deposition process. Accordingly, a thin dielectric film 43 is deposited on and adheres to the entire surface of the rotor plates 25 and the washers 41, as indicated by shaded portion in FIG. 8B. By this thin dielectric film 43 thus coated, the rotor plates 25 and the washers 41 assume a unitary structure. The unitary structure consisting of the rotor plates 25 and the washers 41 is then taken off the jig rod 40, and is cut and divided into blocks, thus obtaining a number of unitary rotor plate groups 25a each of which comprises a predetermined number of rotor plates 25 and washers 41 mechanically connected to each other.

On the other hand, a stator plate assembly is fabricated as indicated in FIGS. 9A and 9B. A plurality of stator plates 26 and stator washers 45 are alternately transfixed on a pair of shafts 44a of a jig 44. The stator plates 26 are not tightened by the nut but only stacked in the axial direction of the shafts 44a. The pair of shafts 44a are embedded in the jig 44 and are separated by a distance equal to that of the adjacent pair of stator support poles 14, and have a length longer than that of the stator support pole 14.

Thereafter, the above described unitary rotor plate group 25a is engaged or meshed with the similarly stacked stator plates 26 in such a manner that the rotor plates 25 and stator plates 26 confront with each other in a state of establishing the maximum electric capacitance, as indicated in FIG. 10.

Then, as the rotor plate group 25a is moved upward, a number of stator plates 26 equal to that of the rotor plates 25 of the group 25a are also displaced upward, in a state of maintaining the above described confronting condition, and finally extracted from the shafts 44a. Now, a plate group assembly 46 consisting of the thus assembled rotor plate group 25a and the stator plate group 26a is obtained, as indicated in FIG. 11.

Finally, the rotor plate group 25a and the stator plate group 26a of the plate group assembly 46 are respectively fitted to the rotor shaft 24 and the stator shaft 14 simultaneously, as indicated in FIG. 11. The first variable capacitor section 27a in the variable capacitor in FIG. 3 is now complete.

Similarly, as in the preceding embodiment, another plate group assembly (not shown) of the rotor plate group 25b and the stator plate group 26b is fitted, but deviating by 180 degrees with respect to the above described first variable capacitor section 27a, to the base plate 11, thus completing a second variable capacitor section 27b.

Here, the rotor plate groups 25a and 25b with their elliptical openings are fitted on the rotor shaft 24 of the elliptical cross section, thus determining their angular position with respect to the rotor shaft 24. Accordingly, the angle between the rotor plate groups 25a and 25b and the arm 47a of the stop member is determined to be a specified value, and no troublesome adjusting operation is required.

According to the above described assembling process, it is sufficient to apply vaporisation deposition to only the rotor plate groups 25a and 25b among the rotor plate groups 25a and 25b, and the stator plate groups 26a and 26b. Accordingly, the manufacturing process is simplified, and moreover, if, for example, a single stator plate 26 is bent or damaged, the whole stator plate group need not be replaced, replacement of the bent or damaged stator plate 26 with a new one is sufficient.

Moreover, in the above described embodiment, vaporisation deposition is applied only to the rotor plate.

Moreover, the manufacturing process may be made in such a manner that only the stator plate groups 26a and 26b are subjected to vaporisation deposition process, and are then cut off into blocks having unitary structure.

Furthermore, the dielectric thin film for making unitary structure may be formed by any suitable known process other than the vaporisation deposition method.

Still furthermore, the shape of the cross section of the rotor shaft 24 and the opening of the rotor plate 25 is not limited to the elliptical shape, but may be of non-circular shape.

Further, this invention is not limited to these embodiments but various variations and modifications may be made without departing from the scope of the invention.

What is claimed is:

1. A miniature variable capacitor comprising:
    a base plate having a base plate main part having stator support poles embedded in one surface of said base plate main part and mounting plate parts extending from said base plate main part in lateral directions and adapted to be fitted to a mount member different from said miniature variable capacitor; and
    a miniature variable capacitor main body comprising a rotor shaft rotatably supported at the center of said base plate main part, stator plate groups fixedly supported on said stator shafts, and rotor plate groups fixedly supported on said rotor shaft,
    said base plate further having bent parts bent in the direction in which said stator poles project and formed between said base plate main part and said mounting plate parts and integral therewith, said mounting plate parts being not on the same level as said base plate main part but stepped in the stator support poles projecting direction from said base plate main part.

2. A miniature variable capacitor as claimed in claim 1 in which said base plate is of metal.

3. A miniature variable capacitor as claimed in claim 1 in which said base plate is formed by pressing a single plate, and said bent part is formed with an opening for facilitating the press forming.

4. A miniature variable capacitor as claimed in claim 1 in which said bent parts extend in such a manner that a surface of said mounting plate parts is positioned in the vicinity of a plane including a surface of said miniature variable capacitor main body, said surface being opposite the surface confronting said base plate main part.

5. A miniature variable capacitor as claimed in claim 1 in which said rotor shaft has a part which passes through said base plate main part and projects outward and to which a rotating member is mounted, and the stepped difference between said base plate main part and said mounting plate part is set larger than the thickness of said mount member, the rotation of said rotating member thereby not being disturbed by said mount member.

6. A miniature variable capacitor as claimed in claim 1 in which said stator support poles are inserted at one distal end part thereof through said base plate main part and fixed by caulking a tip thereof at the other surface of said base plate main part, and said base plate main part has recesses formed in said other surface for accommodating caulked parts of said stator support poles so that said caulked parts do not project from said other surface.

7. A miniature variable capacitor as claimed in claim 1 which further comprises a casing fitted to said base plate and adapted to cover at least a periphery of said miniature variable capacitor main body, the opposite lateral sides of said base plate main part not provided with said bent parts having engagement recesses formed in said lateral side surfaces, and said casing being provided with projections adapted to engage with said engagement recesses of said base plate main part.

8. A miniature variable capacitor as claimed in claim 7 in which said engagement recesses are further recessed from said other surface of said base plate main body, end surfaces of said casing projections thereby not projecting from said other surface of said base plate main part.

9. A miniature variable capacitor as claimed in claim 7 in which said miniature variable capacitor main body further comprises lug terminals extending sideward at a surface opposite the surface confronting said base plate main part, said casing being formed with cuts through which said lug terminals extend outside of the casing.

* * * * *